United States Patent Office.

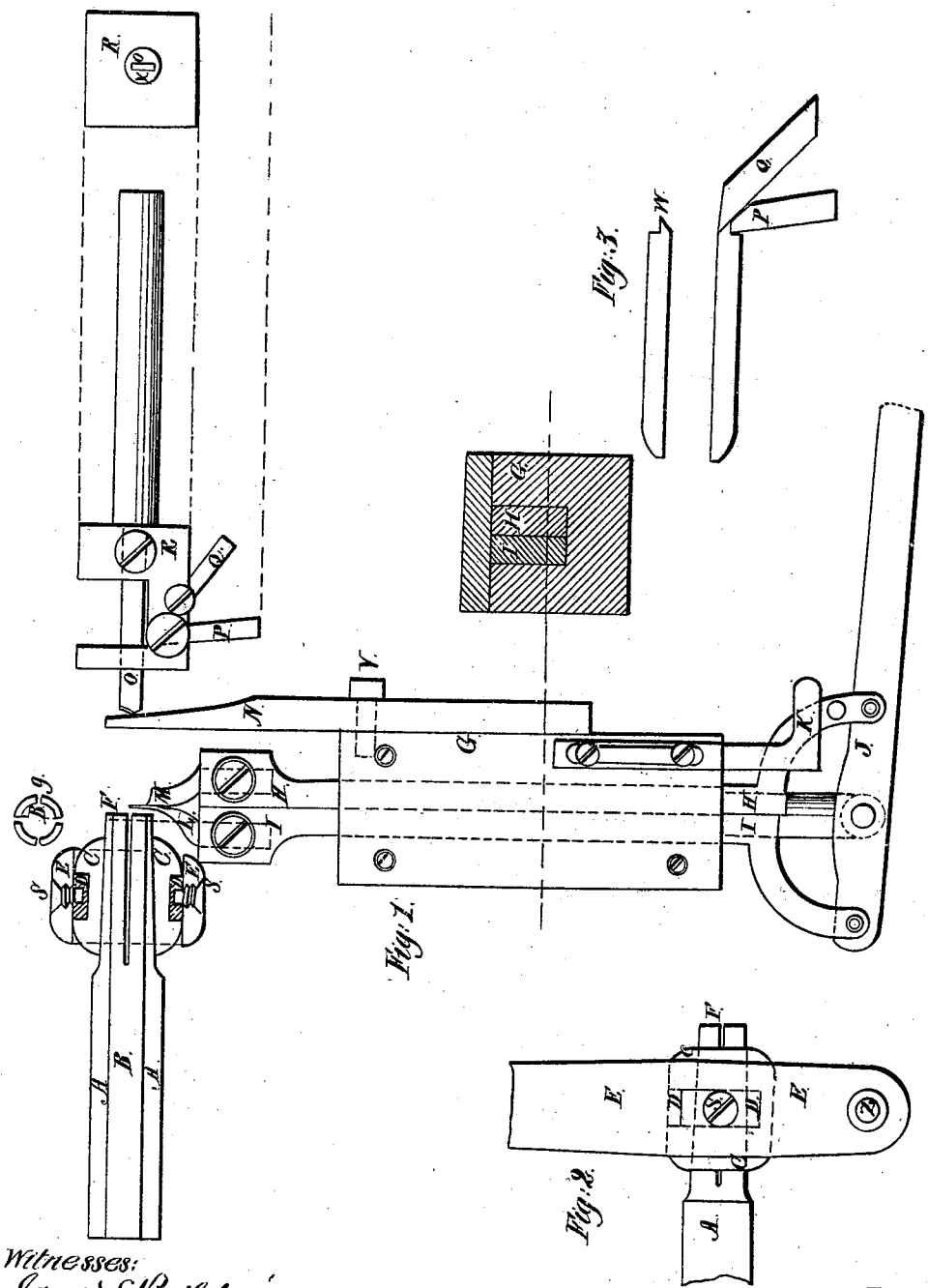
O. M. Grimes.
Lathe.
No. 92,041. Patented Jan. 29, 1869.
Witnesses:
James S. Baldwin
Isaac A. Scheetz
Inventor:
Orlando M. Grimes

ORLANDO M. GRIMES, OF NEWARK, NEW JERSEY.

Letters Patent No. 92,041, dated June 29, 1869.

IMPROVEMENT IN LATHES.

The Schedule referred to in these Letters Patent and making part of the same.

*To all whom it may concern:*

Be it known that I, ORLANDO M. GRIMES, of the city of Newark, county of Essex, and State of New Jersey, have invented certain new and useful Improvements in the Construction of Lathes; and I hereby declare the following to be a full and sufficient description thereof, reference being had to the accompanying drawings, and to the letters of reference marked thereon, making a part of this specification.

My improvements relate to that form of lathe in which the work is fed through a hollow mandrel; and consist of suitable means of gauging the amount of blank stock passed through, together with suitable appliances for holding and centring the revolving piece to be operated upon, and for advancing and withdrawing the tools by which it is shaped.

In the accompanying drawings, those parts of the lathe which involve no novel points have been omitted.

Let A A, Figure I, represent the mandrel of the lathe, pierced from end to end with the channel B, for the introduction of the piece to be operated upon.

The end of this mandrel nearest the cutting-tools is tapered, and divided by four cuts into as many parts, as shown at $g$.

C C is a sleeve, by whose action these parts can be compressed, and caused to grasp, and, at the same time, centre, any enclosed piece of work.

It is actuated by the lever E E, attached to the fulcrum Z, as shown in Figure II.

E E is attached, by the screws S S, to the ring D D, in which C C freely revolves.

My lathe is adapted to the manufacture of an extended variety of articles, but the cutting-tools shown in the drawing are arranged for the production of a carpet-bag-lock cylinder, of which an enlarged section is shown in Figure III.

The blank stock, in the shape of a brass rod, is passed through B, the chuck being relaxed until it touches the gauge N. The chuck is then tightened, the gauge, which is hung on the stud Y, is turned up out of the way, and the flat drill O, and tools P and Q, are moved up until the drill O has pierced a hole through the work, and the tools P and Q have cut the grooves W, as shown in Fig. III.

O, P, and Q, are attached to the stock R, which is actuated by a screw, lever, or other suitable means of moving it steadily back and forth.

When the stock R is withdrawn, the shaping-tool M, held in the stock or holder H H, is advanced by the action of the lever J, whose movement is regulated by the gauge K, as shown.

By reversing the movement of this lever, M is withdrawn, and the cutting-off tool L L, attached to the holder I I, is advanced, and the finished piece cut off.

All of these operations are performed while the lathe is in full motion; and I find, in actual practice, that the finished pieces can be turned out at the rate of seven a minute, and this with a degree of ease and certainty never before attained.

What I claim as my invention, and desire to secure by Letters Patent, is—

1. The combination of hollow tapered and slotted mandrel A, sleeve C, and lever E, as and for the purpose set forth.

2. The combination of the tool-holders I and H, lever J, gauges K and N, as and for the purpose set forth.

3. The arrangement of the drill O, cutters P and Q, and stock R, as and for the purpose set forth.

ORLANDO M. GRIMES.

Witnesses:
JAMES S. BALDWIN,
ISAAC A. SCHULTZ.